United States Patent

Jang

Patent Number: 5,267,550
Date of Patent: Dec. 7, 1993

[54] ASSEMBLY STRUCTURE FOR AN EXTERNAL BODY OF A KITCHEN SOOT EXTRACTOR

[76] Inventor: Sun-Sing Jang, 650, Yuan-Huan E. Rd., Fong-Yuan, Taichung Hsien, Taiwan

[21] Appl. No.: 894,805

[22] Filed: Jun. 4, 1992

[51] Int. Cl.⁵ .............................................. F24C 15/20
[52] U.S. Cl. ................................ 126/299 D; 285/424
[58] Field of Search ...................... 403/335, 336, 383; 285/424; 126/299 R, 299 D; 29/521

[56] References Cited

U.S. PATENT DOCUMENTS

| | | | |
|---|---|---|---|
| 1,465,652 | 8/1923 | Moore | 126/299 D |
| 1,791,255 | 2/1931 | Wagner | 285/424 |
| 1,992,312 | 2/1935 | Kuen | 285/424 |
| 2,703,110 | 3/1955 | Curtis | 285/424 |
| 2,901,963 | 9/1959 | Richardson | 126/299 D |
| 4,441,241 | 4/1984 | Hoeffke | 29/521 |
| 4,964,338 | 10/1990 | Fantoni et al. | 29/521 |
| 5,104,159 | 4/1992 | Sugiyama et al. | 285/424 |

FOREIGN PATENT DOCUMENTS 62896 4/1991 Taiwan ............... 126/299 D

*Primary Examiner*—Carroll B. Dority
*Attorney, Agent, or Firm*—Browdy and Neimark

[57] ABSTRACT

An external body of a soot extractor for effectively devoid of the previously mentioned sharp edges which are capable of inflicting injury on persons. The body includes a top sheet member having left and right edges bending downwardly to form a first fixing means respectively, and two side sheet members respectively attached to the left and right sides of the top sheet member and individually having a main plate portion and a arcuate plate portion, and a second fixing means extending downwardly from the edge of said arcuate plate portion for secured on the first fixing means.

2 Claims, 4 Drawing Sheets

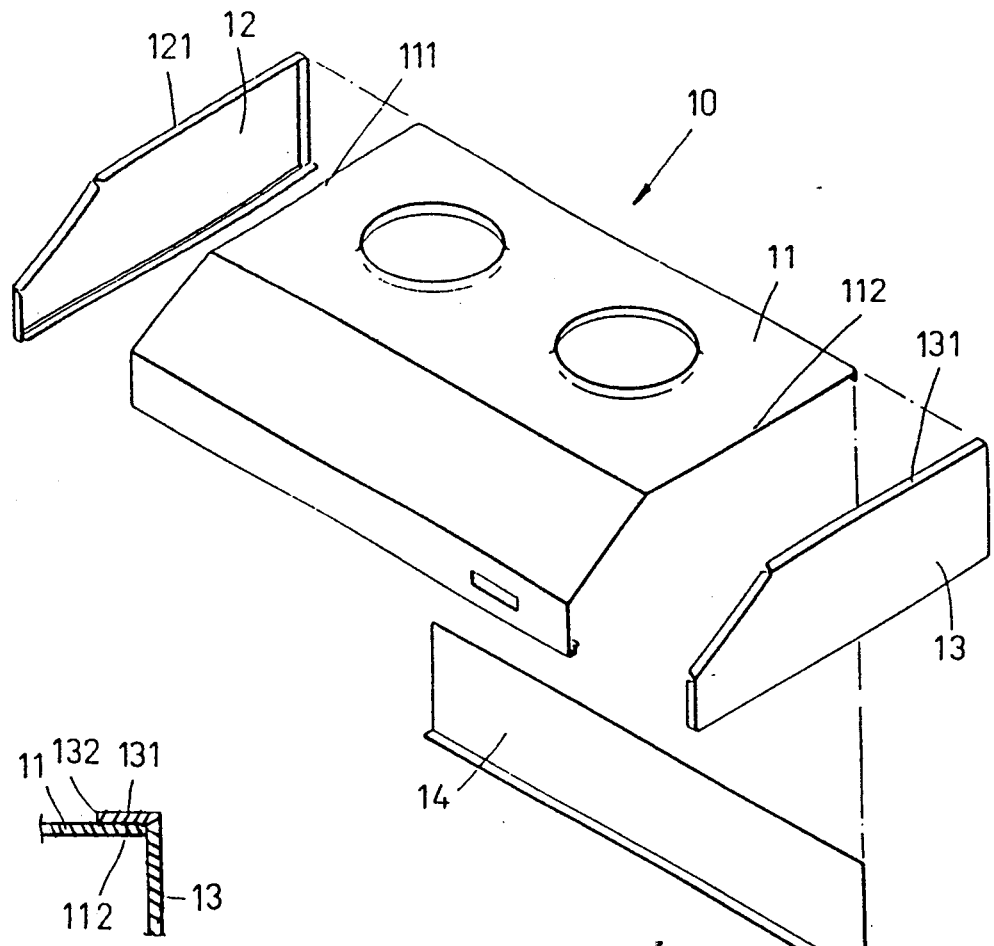
FIG. 3
(PRIOR ART)
FIG. 1
(PRIOR ART)
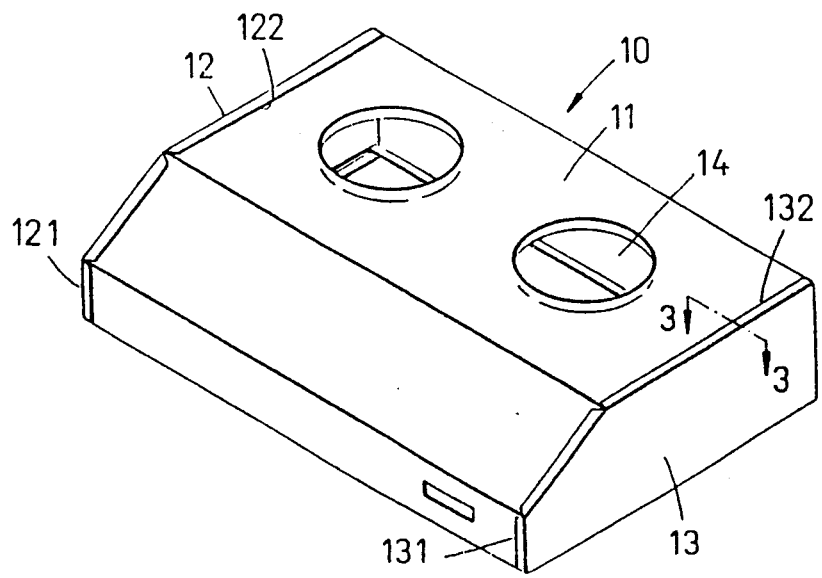
FIG. 2
(PRIOR ART)

ASSEMBLY STRUCTURE FOR AN EXTERNAL BODY OF A KITCHEN SOOT EXTRACTOR

BACKGROUND OF THE INVENTION

The present invention relates generally to a kitchen soot extractor, and more specifically relates to an external body of a kitchen soot extractor.

Referring to FIGS. 1-3, a conventional external body of a kitchen soot extractor is shown. The body 10 comprises a top sheet 11, a left sheet 12, a right sheet 13 and a rear sheet 14. Both the left sheet 12 and the right sheet 13 are provided with projecting flanges 121, 131 around their edges. In the process of combining the various sheets to form the body 10, both the left and right sheets 12 & 13 are united with the top sheet 11 by fitting the projecting flanges 121 & 131 to cover the left and right edges 111 & 112 of the top sheet 11. The left and right sheets 12 & 13 are fastened securely to the top sheet 11 by means of spot welding.

However, such body of a kitchen soot extractor suffers from the following disadvantage: in view of the sheets 11, 12, 13 & 14 being made of thin stainless steel sheet by means of punching and pressing, both the external edges 122 & 132 of the projecting flanges 121 & 131 of the left and right sheets 12 & 13 are very sharp rather like a blade, which often become potential hazards. When a person is transporting or washing the body 10, his hand may be wounded by the edges 122 & 133. It's dangerous.

SUMMARY OF THE INVENTION

The primary object of the present invention is to provide an external body of a kitchen soot extractor having an improved assembly structure for effectively avoiding the previously mentioned sharp edges which are capable of inflicting an injury on persons assembling, transporting or cheaning the soot extractor.

Various embodiments of the present invention will now be described with reference to the accompanying drawings, in which:

BRIEF DESCRIPTION OF THE DRAWINGS

FIG. 1 is an exploded schematic view of the external body of a conventional kitchen soot extractor;

FIG. 2 is a perspective view showing the body of FIG. 1 after assembly;

FIG. 3 is an enlarged fragmentary sectional view taken along the line 3—3 in FIG. 2;

DETAILED DESCRIPTION OF THE PREFERRED EMBODIMENT

Figure 4:
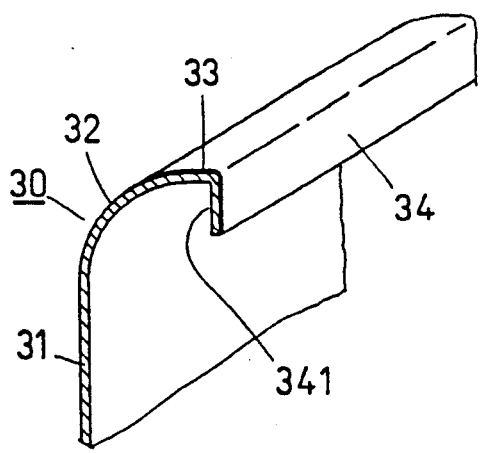
FIG. 4 is a partial perspective view showing a left sheet of a external body of a kitchen soot extractor according to the present invention.

Referring now to FIGS. 4-9, a first preferred embodiment of an external body of a kitchen soot extractor according to the present includes a top sheet member 20, a left sheet member 30, a right sheet member 40, two positioning members 50 and a rear sheet member 100.

The top sheet member 20 is provided at each side with a thrust plate portion 21 formed by bending the left and right sides of the top sheet member 20 downwardly. The bottom edge of the thrust plate projects inwardly through approximately 180 degrees, so as to form a short strip portion 22.

The left sheet member 30 has a main plate portion 31, an arcuate plate portion 32 and a narrow plate portion 33. The side of the narrow plate portion 33 is formed by bending downwardly as to form a vertical plate portion 34.

The structure of the right sheet member 40 is similar the left sheet member 30.

The positioning member 50 includes a base plate 51 having an outer upward wall 52 and an inner upward wall 53, so as to form a generally U-section receiving space 54. The inner upward wall 53 has a plurality of perforations 531 and a halt portion 55 formed by bending the top edge of the inner upward wall 53 outwardly and then downwardly through approximately 180 degrees.

Figure 6:
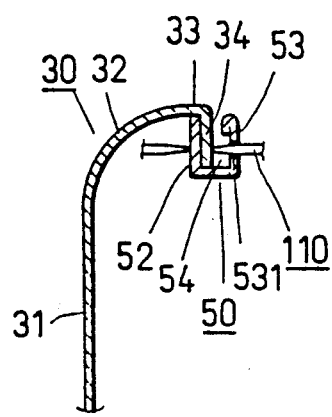
FIG. 6 is a schematic view showing the situation of the assembly of the positioning member and the left sheet shown in FIG. 5 and FIG. 4.
Figure 8:
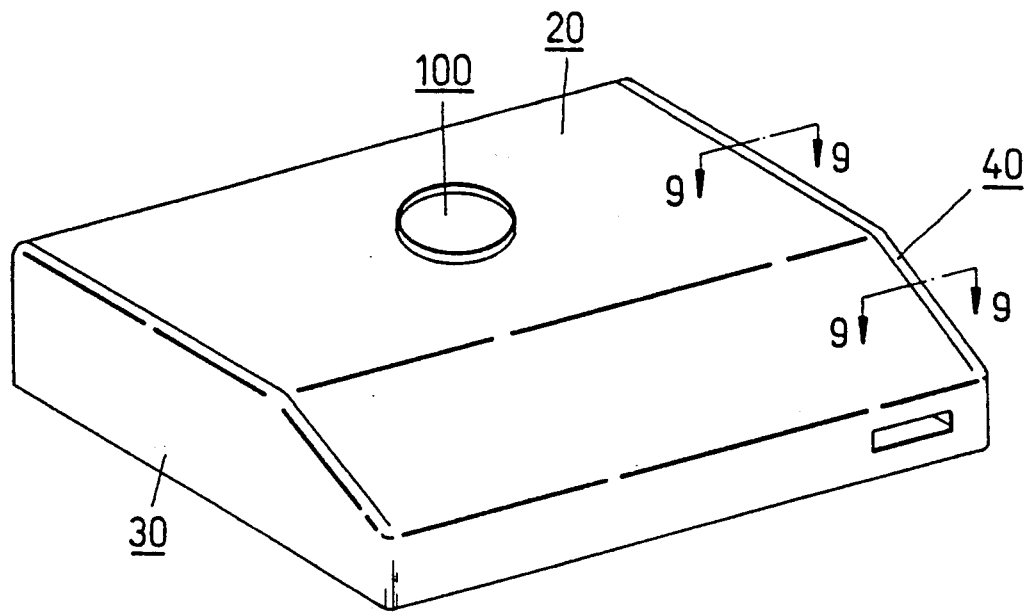
FIG. 8 is a perspective view showing a assembled body of the present invention.

The process of assembling the components described above as follow:

(A) As shown in FIG. 6, fit the inside of the outer upward wall 52 of the positioning member 50 to the inside 341 of the vertical plate portion 34 of the left sheet member 30, and then the fix position member 50 to the plate portion 34 by means of spot welding. The electrode 110 of welding machine can pass through the perforation 531.

Figure 7:
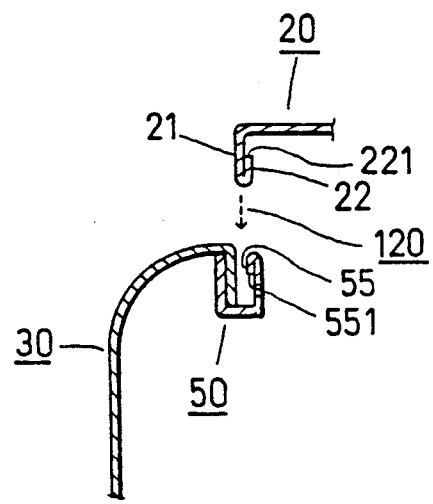
FIGS. 7A and 7B are schematic views showing the stage of the assembly of the components of the first embodiment according to the present invention.
Figure 5:
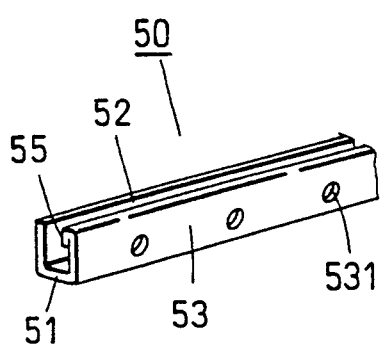
FIG. 5 is a partial perspective view showing a positioning member of a external body of a kitchen soot extractor according to the present invention.
Figure 7:
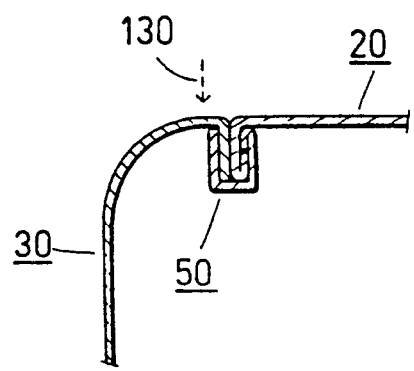

(B) The thrust plate portion 21 is inserted into the receiving space 54 of position member 50 in a direction indicated by the arrow 120 shown in FIG. 7 (A). Thereafter, the top sheet member 20 and the left sheet member 30 are held mechanically locked together in the unique manner just described. Because the bottom edge 551 of the halt portion 55 is propped up by the top edge 221 of the short strip portion 22, the top and left sheet members 20 & 30 are not vulnerable to falling apart when an external force indicated by the dotted arrow 130 in FIG. 7 (B), is exerted upon the left sheet member 30 during the assembly or the transportation of the external body embodying the invention.

Figure 9:
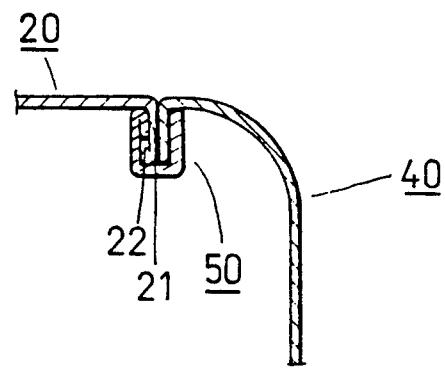
FIG. 9 is a sectional view taken along the line 9—9 in FIG. 8.

Referring to FIG. 9, the right sheet member 40 and the top sheet member 20 are assembled in the same mode as just described.

The external body of a kitchen soot extractor embodying the present invention has the following advantage over the prior art: i.e. the edges of the top sheet and side sheets are united in such a unique manner that are effectively devoid of and exposed sharp edges, so as to effectively prevent an assembly worker, or a person washing the body, from being injured accidentally by such sharp edges.

Figure 10:
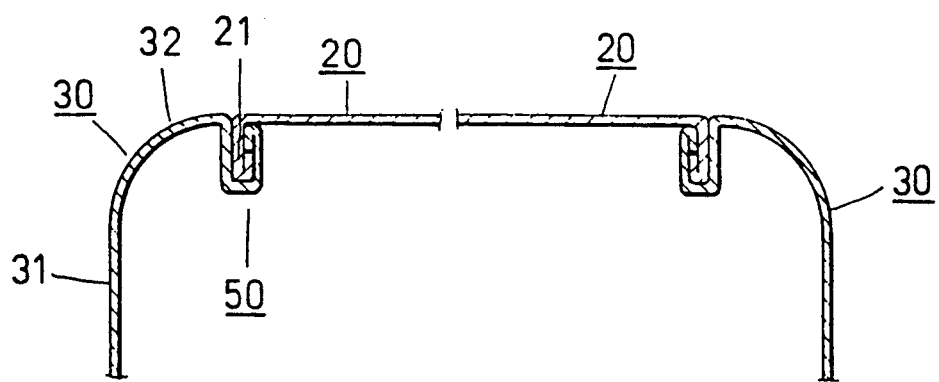
FIG. 10 is a schematic view of the structural features of a second embodiment of the present invention.

FIG. 10 shows a second preferred embodiment of the present invention differing from the embodiment shown in FIGS. 4–9 in that the side sheet member 30 having a main plate portion 31 and an arcuate plate portion 32, and the positioning member is integrally formed to the edge of the arcuate plate portion 32. Thus, this embodiment needn't undergo welding.

Figure 11:
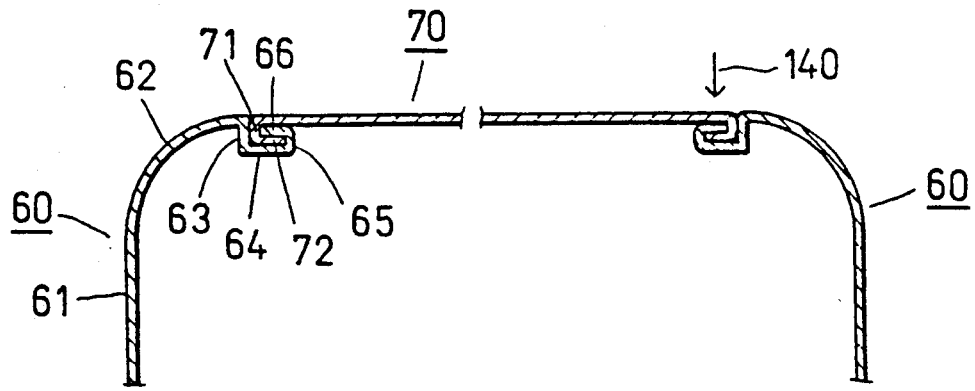
FIG. 11 is a schematic view of the structural features of a third embodiment of the present invention.

A third preferred embodiment of the present invention is shown in FIG. 11, in which the side sheet member 60 has a main plate portion 61 and an arcuate plate portion 62. The edge of the arcuate plate portion 32 extends downwardly to form a first vertical plate portion 63 and then extends outwardly to form a first horizontal plate portion 64. The outer edge of the first horizontal plate portion 64 extends upwardly to form a first curved portion 65, which in turn extends horizontally and inwardly to form a second horizontal plate portion 66. Both sides of the top sheet member 70 extend downwardly to each form a second curved portion 71 and then horizontally and inwardly to form a third horizontal plate portion 72.

In the process of assembling the components described above, the third horizontal plate portion 72 is fitted into the space which between the first and second horizontal plate portion 62 & 64. Thereafter, pressed in a direction indicated by the arrow 140, by means of a pressing tool or similar tool.

Figure 12:
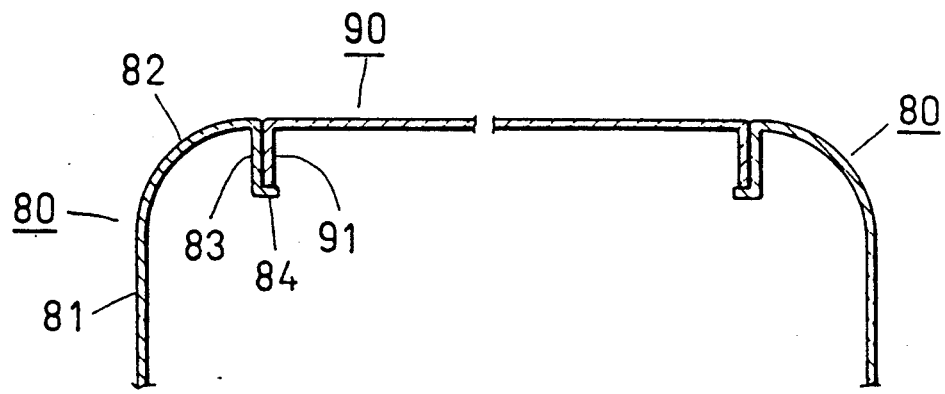
FIG. 12 is a schematic view of the structural features of a fourth embodiment of the present invention.

A fourth preferred embodiment of the present invention is shown in FIG. 12, in which the side sheet member 80 having a main plate portion 81 and a arcuate plate portion 82, too. The edge of the arcuate plate portion 82 extends downwardly to form a first plate portion 83 and then extends appropriate length outwardly to form a positioning portion 84. Both each side of the top sheet member 90 extend downwardly to form a second plate portion 91.

In the process of assembling the external body of the fourth preferred embodiment, the second plate portion 91 is kept close to the first plate portion 83, and position upon the bottom of the positioning portion 84. Afterward, integrate the first and second plate portion 83 & 91 by means of spot welding, rivets, screws, or the like.

Figure 13:
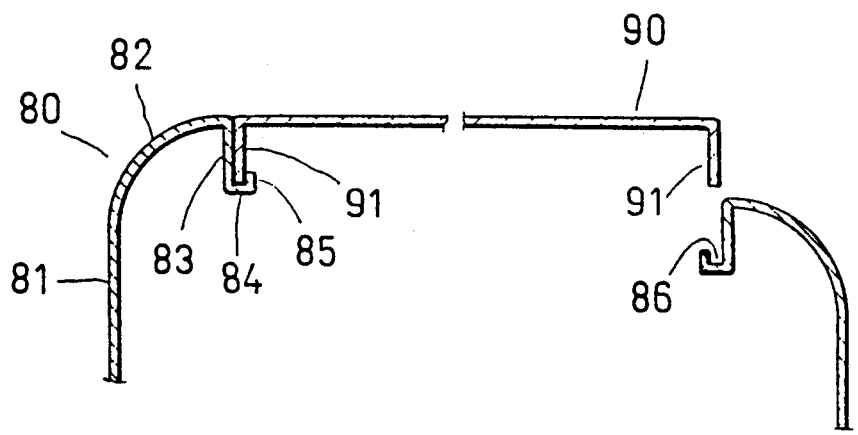
FIG. 13 is a schematic view of the structural features of a fifth embodiment of the present invention.

FIG. 13 shows a fifth preferred embodiment of the present invention differing from the embodiment shown in FIG. 12 in that the edge of positioning portion 84 extends upwardly a short plate portion 85, so as to form a generally U-section beading having a upwardly opening receiving space 86 in order to receive the bottom portion of the second plate portion 91.

The present invention may be embodied in other specific forms without departing from the spirit or essential attributes thereof and, accordingly, reference should be made to the appended claims, rather than to the foregoing specification as indicating the scope of the invention.

I claim:

1. An assembly structure for an external body of a kitchen soot extractor comprising:
   a top sheet member having left and right edges bending downwardly to form a first fixing means respectively;
   two side sheet members respectively attached to the left and right sides of said top sheet member and individually having a main plate portion and an arcuate plate portion, and a second fixing means extending downwardly from the edge of said arcuate plate portion secured on said first fixing means;
   a rear sheet member mounted to said top sheet member and said side sheet members;
   said second fixing means being a vertical plate portion;
   a positioning member including a base plate having an outer upward wall attached to the inside of said vertical plate portion and an inter upward wall, so as to form a generally U-section receiving space, and a halt portion formed by bending the top edge of said inter upward wall outwardly and then downwardly through approximately 180 degrees; and
   said first fixing means including a thrust plate portion formed by bending the left and right sides of said top sheet member downwardly and then inwardly and upwardly through approximately 180 degrees to form a short strip portion, said thrust plate portion being inserted into said receiving space and the bottom edge of said halt portion being propped up by the top edge of said short strip portion.

2. An assembly structure for an external body of a kitchen soot extractor according to claim 1 wherein said inter upward wall further includes a plurality of perforation in order to let the electrode of welding machine passing through.

* * * * *